C. L. PHENICIE.
NUT LOCK.
APPLICATION FILED APR. 6, 1911.
1,011,840.
Patented Dec. 12, 1911.
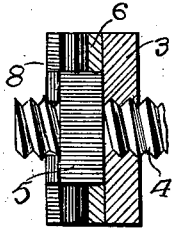
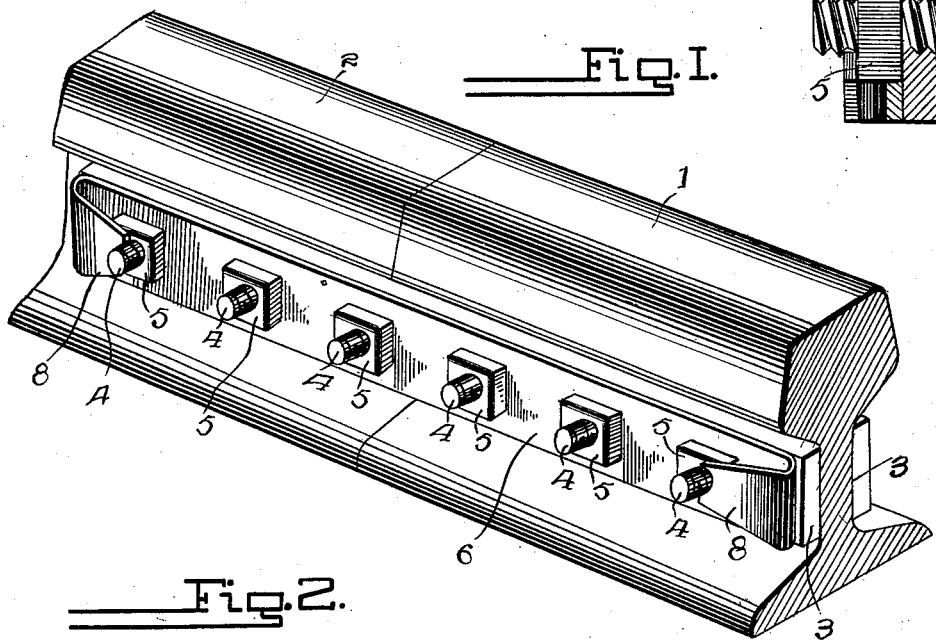
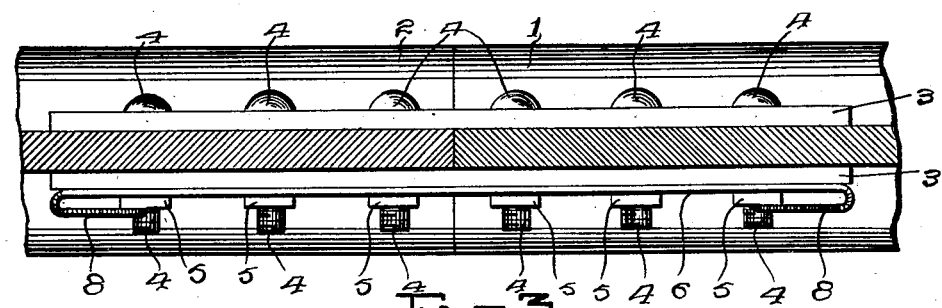
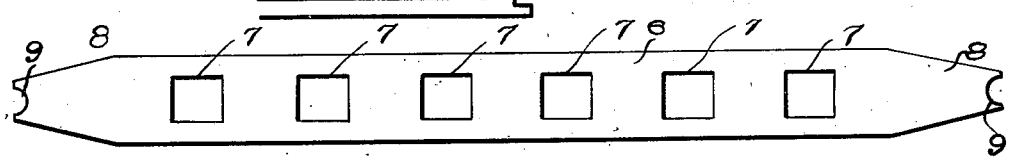
Witnesses
Howard F Costello
Moss Woodward
Inventor
Charles L. Phenicie.
By E. E. Vrooman
his Attorney.

UNITED STATES PATENT OFFICE.

CHARLES L. PHENICIE, OF FRANKLIN, PENNSYLVANIA.

NUT-LOCK.

1,011,840.  Specification of Letters Patent.  Patented Dec. 12, 1911.

Application filed April 6, 1911. Serial No. 619,393.

*To all whom it may concern:*

Be it known that I, CHARLES L. PHENICIE, a citizen of the United States, residing at Franklin, in the county of Venango and State of Pennsylvania, have invented certain new and useful Improvements in Nut-Locks, of which the following is a specification, reference being had therein to the accompanying drawing.

This invention relates to nut locks of the type which are intended to be used in connection with rail joints so that the bolts which connect the fish plates with the ends of the rails will be securely locked in place.

This invention is illustrated in the accompanying drawings, wherein:—

Figure 1 is a perspective view of a pair of rails having the improved nut lock applied to the bolts. Fig. 2 is a longitudinal sectional view through the web of the rails. Fig. 3 is a plan view of the blank from which the improved nut lock is made. Fig. 4 is a fragmentary view showing the manner in which the nut lock is held in place.

In the accompanying drawings, the numerals 1 and 2 designate the ends of a pair of rails, which are connected together by means of the fish plates 3 through which the securing bolts 4 are passed and held in place by the nuts 5. The nut locking means comprises a strip of resilient metal 6 which is preferably formed of spring steel and which is provided with a number of rectangular openings 7 so that the strip can be placed upon the nuts 5 as shown in Figs. 1 and 2. The end portions 8 of the strip 6 are tapered and are each provided with a curved notch 9. The end portions 8 are bent back upon the strip so that the tapered end portions overlap the end openings to such an extent that when the strip is in place the ends of the strip will normally project beyond the end bolts. When the strip is placed upon the nuts, the curved notch engages the threads of the bolt and holds the strip in place, the end portions being forced down upon the bolt so that they will rest against the nuts as shown in Fig. 2 with the edges of the notches 9 engaging the threads of the bolts. After the strip is in position the resiliency of the strip causes the threads of the end bolts to be tightly gripped. When it is desired to remove the nut lock, the end portions can be forced away and the strip removed.

What I claim is:—

As a new article of manufacture, a locking strip for bolt nuts comprising a single length of sheet metal having a central portion of uniform width and thickness, said central portion being provided with a plurality of nut receiving apertures, said strip having its ends tapered to provide terminals of substantially the same width as the diameter of the bolts, said terminals having concave notches therein and extending substantially across the entire width of the terminal, the tapered ends of said strip being rebent to bring each terminal over a nut receiving opening adjacent to said terminal whereby the concave notches will engage the threads of certain of the bolts when the strips are applied thereto.

In testimony whereof I hereunto affix my signature in presence of two witnesses.

CHARLES L. PHENICIE.

Witnesses:
 EDWARD B. PHENICIE,
 HARRY C. CROOP.

Copies of this patent may be obtained for five cents each, by addressing the "Commissioner of Patents, Washington, D. C."